United States Patent
Steuart et al.

(10) Patent No.: US 7,953,636 B2
(45) Date of Patent: May 31, 2011

(54) SYSTEM AND METHOD FOR PROVIDING CUSTOMIZED SALES-RELATED DATA OVER A NETWORK

(75) Inventors: Stacy Rhea Steuart, Lynchburg, VA (US); Tanya Chowdry, Lynchburg, VA (US)

(73) Assignee: Genworth Financial, Inc., Richmond, VA (US)

( * ) Notice: Subject to any disclaimer, the term of this patent is extended or adjusted under 35 U.S.C. 154(b) by 1654 days.

(21) Appl. No.: 09/788,646

(22) Filed: Feb. 21, 2001

(65) Prior Publication Data

US 2002/0116229 A1    Aug. 22, 2002

(51) Int. Cl.
*G07Q 1/12*    (2006.01)
*G06F 17/60*    (2006.01)

(52) U.S. Cl. ............................................ 705/24; 705/34
(58) Field of Classification Search ................... 705/24
See application file for complete search history.

(56) References Cited

U.S. PATENT DOCUMENTS

| | | | |
|---|---|---|---|
| 4,831,526 A | 5/1989 | Luchs | |
| 4,837,693 A | 6/1989 | Schotz | |
| 4,969,094 A | 11/1990 | Halley | |
| 5,191,522 A | 3/1993 | Bosco | |
| 5,195,170 A | 3/1993 | Eberhardt | |
| 5,235,507 A | 8/1993 | Sackler | |
| 5,293,488 A | 3/1994 | Riley et al. | |
| 5,446,653 A * | 8/1995 | Miller et al. | ...................... 705/4 |
| 5,479,344 A | 12/1995 | Kezlah | |
| 5,523,942 A | 6/1996 | Tyler | |
| 5,537,315 A | 7/1996 | Mitcham | |
| 5,557,515 A | 9/1996 | Abbruzzese et al. | |
| 5,590,037 A | 12/1996 | Ryan | |
| 5,615,121 A | 3/1997 | Babayev | |
| 5,655,085 A | 8/1997 | Ryan | |
| 5,668,878 A | 9/1997 | Brands | |
| 5,737,728 A | 4/1998 | Sisley | |
| 5,752,236 A | 5/1998 | Sexton | |
| 5,754,939 A | 5/1998 | Herz et al. | |
| 5,781,633 A | 7/1998 | Tribble et al. | |
| 5,809,478 A | 9/1998 | Greco et al. | |
| 5,835,087 A | 11/1998 | Herz et al. | |
| 5,845,256 A | 12/1998 | Pescitelli | |
| 5,845,281 A * | 12/1998 | Benson et al. | ...................... 707/9 |

(Continued)

FOREIGN PATENT DOCUMENTS

WO    WO 0191017    11/2001

OTHER PUBLICATIONS www.priceline .com Feb. 29, 2000.*

(Continued)

*Primary Examiner* — Matthew S Gart
*Assistant Examiner* — Garcia Ade
(74) *Attorney, Agent, or Firm* — Hunton & Williams

(57) ABSTRACT

A system and method for providing sales-related data over a network. The method includes the steps of receiving a request for sales-related data from a user, receiving request-related information from the user and generating the sales-related data based on the received request-related information. The request may be from a user at a broker address. The method further includes the steps of accessing broker information from a broker information database based on the broker address and displaying at least a portion of the broker information with at least a portion of subsequent information presented to the user.

14 Claims, 4 Drawing Sheets

U.S. PATENT DOCUMENTS

| | | | |
|---|---|---|---|
| 5,873,066 A | 2/1999 | Underwood | |
| 5,903,873 A | 5/1999 | Peterson | |
| 5,907,828 A | 5/1999 | Meyer | |
| 5,943,652 A | 8/1999 | Sisley | |
| 5,956,691 A | 9/1999 | Powers | |
| 5,963,911 A | 10/1999 | Walker | |
| 6,016,344 A | 1/2000 | Katz | |
| 6,018,714 A | 1/2000 | Risen | |
| 6,026,364 A | 2/2000 | Whitworth | |
| 6,041,123 A | 3/2000 | Colvin | |
| 6,076,072 A | 6/2000 | Libman | |
| 6,078,890 A | 6/2000 | Mangin | |
| 6,085,176 A | 7/2000 | Woolston | |
| 6,092,047 A | 7/2000 | Hyman | |
| 6,128,598 A | 10/2000 | Walker | |
| 6,134,530 A | 10/2000 | Bunting | |
| 6,272,528 B1 | 8/2001 | Cullen et al. | |
| 6,285,998 B1 | 9/2001 | Black | |
| 6,298,377 B1* | 10/2001 | Hartikainen et al. | 709/223 |
| 6,324,568 B1 | 11/2001 | Diec | |
| 6,334,111 B1 | 12/2001 | Carrott | |
| 6,356,880 B1 | 3/2002 | Goossens | |
| 6,405,175 B1 | 6/2002 | Ng | |
| 6,411,939 B1 | 6/2002 | Parsons | |
| 6,456,979 B1 | 9/2002 | Flagg | |
| 6,510,432 B1 | 1/2003 | Doyle | |
| 6,523,027 B1 | 2/2003 | Underwood | |
| 6,609,106 B1 | 8/2003 | Robertson | |
| 6,615,180 B1 | 9/2003 | Anderton | |
| 6,633,899 B1* | 10/2003 | Coward | 709/202 |
| 6,643,661 B2* | 11/2003 | Polizzi et al. | 707/100 |
| 6,647,374 B2 | 11/2003 | Kansal | |
| 6,662,164 B1 | 12/2003 | Koppelman | |
| 6,684,189 B1* | 1/2004 | Ryan et al. | 705/4 |
| 6,701,362 B1 | 3/2004 | Subramonian et al. | |
| 6,714,914 B1 | 3/2004 | Peters | |
| 6,735,569 B1 | 5/2004 | Wizig | |
| 6,741,993 B1 | 5/2004 | Zitaner et al. | |
| 6,792,410 B1 | 9/2004 | Donovan | |
| 6,862,580 B1 | 3/2005 | Ford | |
| 6,917,968 B2* | 7/2005 | Nakamura | 709/217 |
| 6,981,214 B1 | 12/2005 | Miller et al. | |
| 7,117,170 B1* | 10/2006 | Bennett et al. | 705/34 |
| 7,143,051 B1* | 11/2006 | Hanby et al. | 705/4 |
| 7,240,015 B1 | 7/2007 | Karmouch | |
| 7,490,050 B2 | 2/2009 | Grover et al. | |
| 2001/0023404 A1 | 9/2001 | Masaki | |
| 2001/0032094 A1 | 10/2001 | Ghosh | |
| 2001/0032181 A1 | 10/2001 | Jakstadt et al. | |
| 2001/0034622 A1 | 10/2001 | Davis | |
| 2001/0037265 A1 | 11/2001 | Kleinberg | |
| 2001/0047282 A1 | 11/2001 | Raveis | |
| 2001/0049611 A1 | 12/2001 | Peach | |
| 2002/0002475 A1 | 1/2002 | Freedman et al. | |
| 2002/0022976 A1 | 2/2002 | Hartigan | |
| 2002/0026334 A1 | 2/2002 | Igoe | |
| 2002/0029158 A1 | 3/2002 | Wolff | |
| 2002/0046064 A1 | 4/2002 | Maury | |
| 2002/0052765 A1 | 5/2002 | Taylor | |
| 2002/0055860 A1 | 5/2002 | Wahlbin | |
| 2002/0055862 A1 | 5/2002 | Jinks | |
| 2002/0059084 A1 | 5/2002 | Wahlbin | |
| 2002/0059085 A1 | 5/2002 | Wahlbin | |
| 2002/0059086 A1 | 5/2002 | Wahlbin | |
| 2002/0059087 A1 | 5/2002 | Wahlbin | |
| 2002/0062232 A1 | 5/2002 | Wahlbin | |
| 2002/0062233 A1 | 5/2002 | Wahlbin | |
| 2002/0062234 A1 | 5/2002 | Wahlbin | |
| 2002/0062235 A1 | 5/2002 | Wahlbin | |
| 2002/0069091 A1 | 6/2002 | Wahlbin | |
| 2002/0069092 A1 | 6/2002 | Wahlbin | |
| 2002/0082871 A1 | 6/2002 | Younger | |
| 2002/0082873 A1 | 6/2002 | Wahlbin | |
| 2002/0087363 A1 | 7/2002 | Wahlbin | |
| 2002/0087364 A1 | 7/2002 | Lerner et al. | |
| 2002/0091550 A1 | 7/2002 | White et al. | |
| 2002/0103729 A1 | 8/2002 | Young | |
| 2002/0111835 A1 | 8/2002 | Hele | |
| 2002/0116228 A1 | 8/2002 | Bauer | |
| 2002/0116229 A1 | 8/2002 | Steuart | |
| 2002/0116231 A1 | 8/2002 | Hele | |
| 2002/0120474 A1 | 8/2002 | Hele | |
| 2002/0120476 A1 | 8/2002 | Labelle | |
| 2002/0120477 A1 | 8/2002 | Jinnett | |
| 2002/0128881 A1 | 9/2002 | Wahlbin | |
| 2002/0133383 A1 | 9/2002 | Chao | |
| 2002/0138308 A1 | 9/2002 | Harada | |
| 2002/0138310 A1 | 9/2002 | Sagalow | |
| 2002/0147618 A1 | 10/2002 | Mezrah | |
| 2002/0156780 A1 | 10/2002 | Hertz | |
| 2002/0165821 A1 | 11/2002 | Tree | |
| 2002/0169650 A1 | 11/2002 | Dougherty et al. | |
| 2002/0169678 A1 | 11/2002 | Chao | |
| 2002/0188484 A1 | 12/2002 | Grover | |
| 2002/0194033 A1 | 12/2002 | Huff | |
| 2003/0005299 A1 | 1/2003 | Xia | |
| 2003/0088443 A1 | 5/2003 | Majikes et al. | |
| 2003/0093302 A1 | 5/2003 | Quido et al. | |
| 2003/0093304 A1 | 5/2003 | Keller | |
| 2003/0182290 A1 | 9/2003 | Parker | |
| 2003/0187768 A1 | 10/2003 | Ryan | |
| 2003/0200122 A1 | 10/2003 | Nauert | |
| 2003/0204421 A1 | 10/2003 | Houle | |
| 2003/0208384 A1 | 11/2003 | Nelson | |
| 2004/0030587 A1 | 2/2004 | Danico | |
| 2004/0030589 A1 | 2/2004 | Leisher | |
| 2004/0059639 A1 | 3/2004 | Ripper | |
| 2004/0083125 A1 | 4/2004 | Almeida | |
| 2004/0103006 A1 | 5/2004 | Wahlbin | |
| 2004/0103007 A1 | 5/2004 | Wahlbin | |
| 2004/0103008 A1 | 5/2004 | Wahlbin | |
| 2004/0103010 A1 | 5/2004 | Wahlbin | |
| 2004/0128147 A1 | 7/2004 | Vallinayagam | |
| 2004/0128170 A1 | 7/2004 | MacKethan | |
| 2004/0128171 A1 | 7/2004 | Rees | |
| 2004/0128172 A1 | 7/2004 | Van Cleave | |
| 2004/0153347 A1 | 8/2004 | Kunze | |
| 2004/0205456 A1 | 10/2004 | Hammock | |
| 2004/0225535 A1 | 11/2004 | Bond | |
| 2004/0267651 A1 | 12/2004 | Jenson et al. | |
| 2005/0055248 A1 | 3/2005 | Helitzer | |
| 2005/0055249 A1 | 3/2005 | Helitzer | |
| 2005/0060182 A1 | 3/2005 | Nagelvoort | |
| 2005/0060208 A1 | 3/2005 | Gianantoni | |
| 2005/0114184 A1 | 5/2005 | Rock | |
| 2005/0125260 A1 | 6/2005 | Green | |
| 2005/0144046 A1 | 6/2005 | Schloss | |
| 2005/0144047 A1 | 6/2005 | Tran | |
| 2005/0187802 A1 | 8/2005 | Koeppel | |
| 2005/0193063 A1 | 9/2005 | Cannata et al. | |
| 2005/0209893 A1 | 9/2005 | Nahra | |
| 2006/0020530 A1 | 1/2006 | Hsu et al. | |
| 2006/0064330 A1 | 3/2006 | Sumino | |
| 2006/0206362 A1 | 9/2006 | Rudy | |
| 2007/0156460 A1 | 7/2007 | Nair | |
| 2007/0174096 A1 | 7/2007 | Cain | |
| 2007/0192145 A1 | 8/2007 | Hellickson | |

OTHER PUBLICATIONS

Patrizio, Legacy Data: One Solution For Two Big Problems, Informationweek.com, Jun. 2000, pp. 124, 126, 128.

Akibia, CRM: Case Studies, Consulting: Clients, <http:/www.polaris1.com/ecrm/casestudies/citibank/default.asp>, printed Mar. 26, 2002, 2 pages.

SIEBELFANS.COM, What is Siebel?, <http:/www.siebelfans.com/More_on_siebel.htm>, printed Mar. 26, 2002, 3 pages.

Siebel.com, "Implementing Best Practices," http://www.siebel.com/call-center/workflow-automation.shtm, printed Feb. 24, 2005, 2 pages.

Information available from the web side of Client Marketing Systems, "Advisors Assistant," Sep. 16, 2000, 6 pages.

Staples, Edward, "VA fees discounted via front loading", Advisor Today, Feb. 2000, vol. 95, No. 2, pp. 128.

Anonymous, information available from the web side of Climark, Apr. 1999, 4 pages.

Anonymous, No. 42230884, "Penn Treaty American Corporation Launches Online Resource Center", PR Newswire, Jun. 8, 1999, 2 pages.

"Start-up targets sales commissions with TallyUp suite," InfoWorld Daily News, Jun. 22, 1998, pp. 1-2.

"Sensormatic Selects Triology's SC Commission for Dynamic Sales Compensation Management," Business Wire, Jun. 8, 1999, pp. 1-2.

Anonymous, "Conseco Expands Web Site, Latest Step in Ongoing Initiative to Become; "Resource center" for Middle-America Customers and Representatives", Business Wire, Jul. 15, 1999, No. 43177075, 3 pages.

Holyoke, Larry, "missouri hot online market for Genelco, other insureres", Mar. 13, 2000, vol. 20, No. 27, pp. 37.

PCT-International Search Report dated Oct. 2, 2002 for Application No. PCT/US02/04958, filed Feb. 21, 2002.

"Sam's Teach Yourself Active Server™ Pages in 24 Hours", Jun. 1999, Sams Publishing (11 pages).

Nguyen, Accessing relational databases from the World Wide Web, Jun. 1996, ACM SIGMOD, vol. 25, Issue 2, pp. 529-540 (12 pages).

Iyengar, Dynamic argument embedding: preserving state on the World Wide Web, Mar. 1997, Internet Computer, IEEE, vol. 1, Issue 2, p. 50-56 (7 pages).

McCandless, Web advertising, May 1998, Intelligent Systems and Their Applications, IEEE, vol. 13, Issue 3, p. 8-9 (2 pages).

Delbaere, IAA 2001 White Paper Insurance Application Architecture (IAA), Mar. 27, 2001, IBM. (16 pages).

* cited by examiner

SYSTEM AND METHOD FOR PROVIDING CUSTOMIZED SALES-RELATED DATA OVER A NETWORK

BACKGROUND OF THE INVENTION

This invention relates generally to an automated system and method for processing a query to a web-based database. More particularly, the invention relates to an access and a query of a database or a data repository containing sales-related information personalized for use by an entity's independent sales agents, brokers, distributors or dealers (hereinafter referred to collectively as "brokers").

Many suppliers utilize independent (i.e., non-employee or non-affiliate) brokers to extend their territorial reach or manpower and thereby increase sales of their products and/or services. A supplier typically has various requirements, such as training, which a prospective broker must fulfill prior to becoming authorized to sell products/services on behalf of the supplier. Once the prospective broker is authorized to sell the supplier's products/services, it is typical to have a relationship whereby the supplier pays the broker a commission or a fee in exchange for a sale of one of the supplier's products/services. In a situation in which the broker is merely an agent acting on behalf of the supplier as a principal, the supplier may have control over the pricing of its products/services to an end customer. In such a situation, the supplier is the party actually contracting with the end customer, although the broker/agent may process a required product/service sales contract with the end customer.

If the supplier utilizes a large number of independent sales agents or brokers, it is frequently difficult to determine whether all of the brokers are using the most recent sales-related information concerning the supplier's products/services. For example, when providing a quote for an insurance-related product, the broker needs to receive the most recent sales-related data to provide an accurate quote to a prospective end customer. However, it may take weeks for an update to the sales-related data to be distributed to the broker, and for the broker to use this update to the sales-related data in the broker's sales activities. During the interim time, the broker may use, and the prospective end customer may receive, out-of-date sales-related data. In some instances, by the time the broker receives the update to the sales-related data, the update is no longer current.

In certain regulated industries, such as the insurance industry, in order for an independent sales agent/broker to market, promote and sell insurance products/services on behalf of the supplier, such sales agent/broker must be licensed to sell insurance products/services in each state or jurisdiction in which such sales agent/broker seeks the ability to sell the supplier's products/services. Such licensure requirements add another level of detail to the information which the supplier must maintain as to such sales agents/brokers.

BRIEF SUMMARY OF THE INVENTION

The deficiencies in distribution of sales-related data to brokers set forth above can be addressed through the system and method of the present invention. In an exemplary embodiment of the invention, a method for providing sales-related data over a network is provided. The method comprises the steps of receiving a request for sales-related data from a user at a broker address; accessing broker information from a broker information database based on the broker address; displaying at least a portion of the broker information with at least a portion of subsequent information presented to the user; receiving request-related information from the user; and generating the sales-related data based on the received request-related information.

In another aspect, a system for providing sales-related data over a network is provided. The system comprises means for receiving a request for sales-related data from a user at a broker address; means for accessing broker information from a broker information database based on the broker address; means for displaying at least a portion of the broker information with at least a portion of subsequent information presented to the user; and means for generating the sales-related data based on the received request-related information.

The accompanying drawings, which are incorporated in and constitute a part of this specification, illustrate embodiments of the invention and, together with the description, serve to explain the principles of the invention.

DETAILED DESCRIPTION OF THE PREPARED EMBODIMENTS

Figure 1:
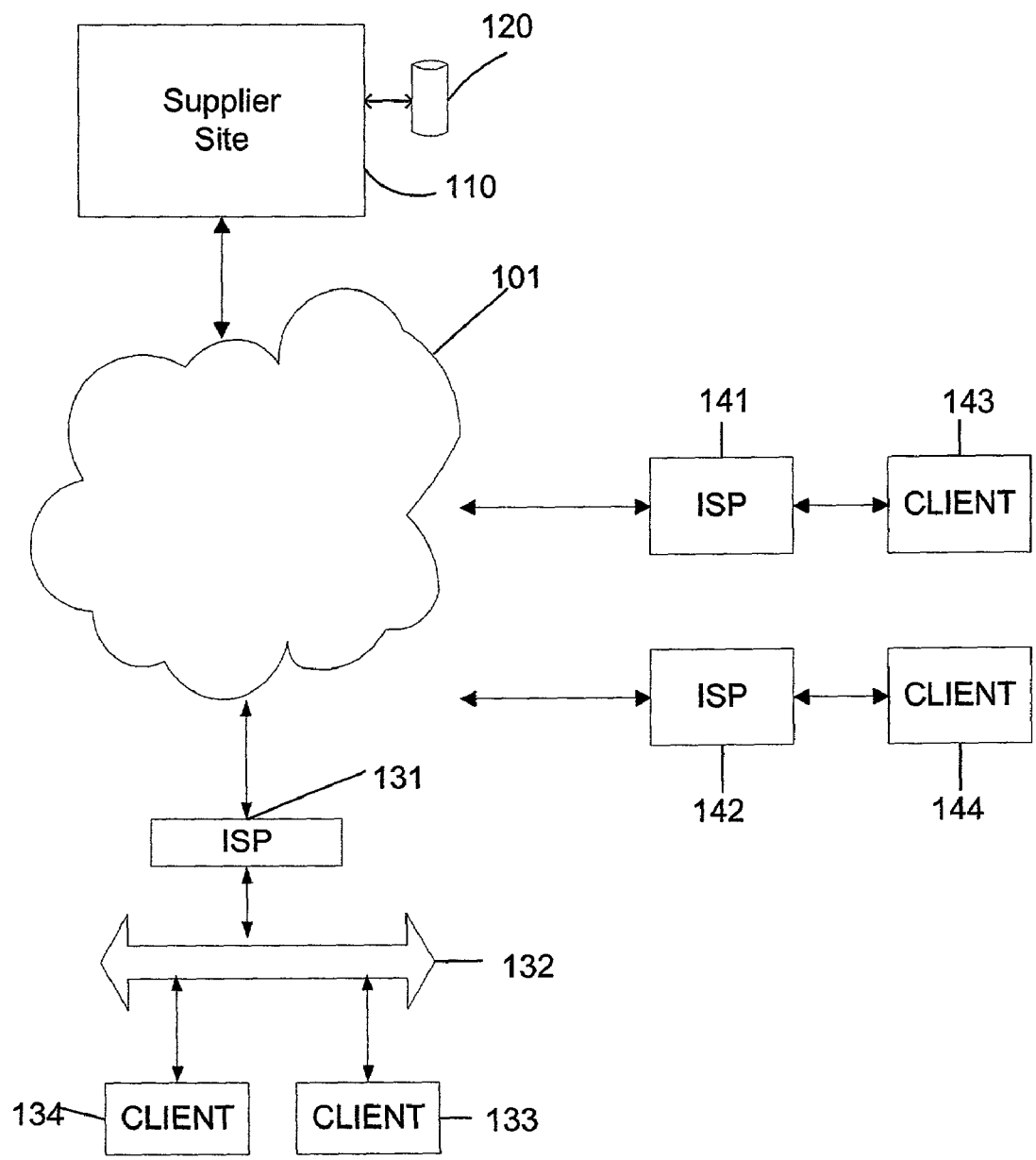
FIG. 1 is a block diagram illustrating one embodiment of a system for providing customized sales-related data over a network.

Reference will now be made in detail to the present preferred embodiments of the invention, examples of which are illustrated in the accompanying drawings in which like reference characters refer to the corresponding elements.

The present invention is described in relation to a system and method for providing customized sales-related data over a network. Nonetheless, the characteristics and parameters pertaining to the system and method of the invention may be applicable to providing customized data of other types.

In terms of a general environment and resources in or with which the invention may operate, the system of the invention may include a computer system. The computer system may include a bus or other communication mechanism for communicating information and a processor coupled to the bus for processing information. The computer system may also include a main memory such as a random access memory (RAM) or other dynamic storage device, coupled to the bus for storing information and instructions to be executed by the processor. The main memory also may be used for storing one or more temporary variables or other intermediate information during execution of a plurality of instructions by the processor. The computer system may further include a read only memory (ROM) or other static storage device coupled to the bus for storing static information and instructions for execution by the processor. A storage device such as a magnetic disk or an optical disk may be provided and coupled to the bus for storing information and instructions.

The computer system may be coupled via the bus to a display, such as a cathode ray tube (CRT), a liquid crystal display (LCD), or another device, for displaying information to a computer system user. An input device, including a plurality of alphanumeric and other keys, may be coupled to the bus for communicating information and command selections to the processor. Another type of input device such as a cursor control, a mouse, a trackball, or one or more cursor direction keys may be used for communicating directional information and command selections to the processor and for controlling cursor movement on the display. The input device typically should have two degrees of freedom in two axes, a first axis (e.g., an x axis) and a second axis (e.g., a y axis), that allows the input device to specify a plurality of positions in a plane.

The invention is related to the use of the computer system for providing personalized access to information in a sales-related database, using a computer, a network and other resources. According to one embodiment of the invention, a method of providing personalized access to information in the sales-related database may be conducted via the computer system in response to the processor executing one or more sequences of one or more instructions stored in the main memory. The one or more instructions may be read into the main memory from another computer-readable medium, such as the static storage device. Execution of the one or more sequences of the one or more instructions stored in the main memory causes the processor to perform the steps in the method described herein. One or more processors in a multi-processing arrangement may also be employed to execute the one or more sequences of the one or more instructions stored in the main memory. In alternative embodiments, hard-wired circuitry may be used in place of, or in combination with, software instructions to implement the invention. Thus, embodiments of the invention are not limited to any specific combination of hardware circuitry and software.

The term "computer-readable medium" as used herein refers to any medium that participates in providing the one or more instructions to the processor for execution. The computer-readable medium may take many forms, including but not limited to, a non-volatile computer-readable medium, a volatile computer-readable medium, and a transmission computer-readable medium. The non-volatile computer-readable medium may include a dynamic memory, such as the main memory. The transmission computer-readable medium may include a coaxial cable, a copper wire and a fiber optic network, including one or more wires that comprise the bus. The transmission computer-readable medium may also take the form of a plurality of acoustic or light waves, such as those generated during radio frequency (RF) and infrared (IR) data communications. Common forms of computer-readable media include, for example, a floppy disk, a flexible disk, a hard disk, a magnetic tape and any other magnetic medium, a CDROM, a DVD, and any other optical medium, one or more punch cards, a paper tape, any other physical medium with patterns of holes, a RAM, a PROM, an electrically-programmable read-only memory (EPROM), a FLASH-EPROM, any other memory chip or a cartridge, a carrier wave as described hereinafter, or any other medium from which a computer can read data stored therein.

Various forms of computer readable media may be involved in executing the one or more sequences of the one or more instructions by the processor. For example, the one or more instructions may initially be borne on a magnetic disk of a remote computer. The remote computer can load the one or more instructions into a dynamic memory and can send the one or more instructions over a telephone line using a modem. A modem local to the computer system can receive the one or more instructions sent over the telephone line and can use an infrared transmitter to convert the received one or more instructions to an infrared signal which acts to carry the converted one or more instructions. An infrared detector coupled to the bus can receive the converted one or more instructions carried in the infrared signal and can place the received one or more instructions on the bus. The bus carries the received one or more instructions to the main memory, from which the processor retrieves and executes the received one or more instructions. The one or more instructions received by the main memory may optionally be stored on a storage device as described herein, either before or after execution by the processor.

The computer system may also include a communication interface coupled to the bus. The communication interface provides a two-way data communication coupling to a network link that is connected to a local network or another network. For example, the communication interface may be an integrated service digital network (ISDN) card or a modem to provide a data communication connection to a corresponding type of telephone line. As another example, the communication interface may be a local area network (LAN) card to provide a data communication connection to a compatible LAN. Wireless links also may be implemented. In any such implementation, the communication interface sends and receives electrical, electromagnetic or optical signals that carry digital data streams representing various types of information.

The network link typically provides data communication through one or more networks to other data devices. For example, the network link may provide a connection through a local network to a host computer, a server or to other data equipment operated by an Internet Service Provider (ISP) or other entity. The ISP in turn provides data communication services through the world wide packet data communication network, now commonly referred to as the "Internet". The local network and the Internet both use electrical, electromagnetic or optical signals that carry digital data streams. The signals through the various networks and the signals on the network link and through the communication interface, which carry the digital data to and from the computer system, are exemplary forms of carrier waves transporting the information.

The computer system can send messages and receive data, including program code, through the network(s), the network link, and the communication interface. In the Internet example above, a server might transmit requested code for an application through the Internet, the ISP, a local network and the communication interface. In accordance with the invention, one such application may be used for operating and maintaining the computer system described herein. The received requested code may be executed by the processor as it is received and/or stored in a storage device, or other non-volatile storage for later execution. In this manner, the computer system may obtain code for an application via a carrier wave or other communications means.

FIG. 1 is a block diagram illustrating one embodiment of a system 100 for providing sales-related data in accordance with the invention. The system 100 may include a supplier site 110, having a database 120, a network 101, a plurality of ISPs 131, 141, 142, and a plurality of users or clients 133, 134, 143, 144.

The network 101 may comprise any appropriate network, such as, for example, the Internet. The clients 133, 134, 143, 144 may be connected to the Internet 101, through the ISPs 131, 141,142. In one embodiment, the clients 133 and 134 are coupled to the ISP 131 through a network 132, the client 143 is coupled to the ISP 141 and the client 144 is coupled to the ISP 142. The supplier site 110 is also connected to the Internet 101.

Although only four clients 133, 134, 143, 144 are shown in FIG. 1, in actual practice, there may be fewer or significantly more clients connected to the system 100 than shown. Additional clients may be connected through the same ISPs shown or through other ISPs. However, for purposes of illustration, the discussion will assume the four clients 133, 134, 143, 144 connected to the Internet 101 through the three ISPs 131, 141, 142.

Although any network may be used for the system 100, for the purpose of illustration, the clients 133, 134, 143, 144 and the supplier site 110 are shown to be connected to the Internet 101. The clients 133, 134, 143, 144 may have resident therein at least one user interface (UI) application module. In one embodiment, the UI application module may include an Internet browser, such as Netscape Navigator™ or Microsoft Internet Explorer™. The clients 133, 134, 143, 144 may further include a communication application module, such as an email application such as Microsoft Beyond Mail™, Netscape Mail™, Eudora Pro™ or the like.

The clients 133, 134, 143, 144 may represent customers or users of the supplier site 110. The clients 133, 134, 143,144 may access the supplier site 110 through the ISPs 131, 141, 142, which are coupled to the Internet 101. The clients 133, 134, 143, 144 may represent users or customers requesting sales-related data from a broker of a supplier that operates the supplier site 110. In one embodiment, one or more of the clients 133, 134, 143, 144 may represent a customer seeking an insurance premium quote from one or more of the remaining clients 133, 134, 143 and 144 where the one or more of the remaining clients 133, 134, 143 and 144 represents an insurance agent or broker representing an insurance entity.

According to one embodiment of the invention, the clients 133, 134, 143, 144 may be users with any computing device capable of accessing the Internet 101 through the ISPs 131, 141, 142. Alternatively, some or all of the clients 133, 134, 143, 144 may access the Internet 101 through a direct connection. The clients 133, 134, 143, 144 may each have a system that comprises a personal computer having a modem module, a display module, a memory module, various input device modules and a central processing module. As may be appropriate, the systems of the clients 133, 134, 143, 144 may each further comprise one or more special purpose devices optimized solely for various applications but with the ability to access the Internet 101.

Each of the systems associated with each of the clients 133, 134, 143, 144 may include a personal computer running a Microsoft® Windows 95® operating system, a Microsoft® Windows 98® operating system, a Microsoft® Windows 2000® operating system, a Microsoft® Windows NT® operating system, a Microsoft® Windows CE operating system, a Millennium operating system, a Palm OS™ operating system, a Unix operating system, a Linux operating system, a Solaris™ operating system, an OS/2™ operating system, a BeOS™ operating system, a MacOS operating system or another operating system or platform. The systems associated with each of the clients 133, 134, 143, 144 may also include a microprocessor such as an Intel x86-based device, a Motorola 68K device, a PowerPC™ device, a MIPS device, a Hewlett-Packard Precision™ device, an Alpha™ RISC processor manufactured by Digital Equipment Corporation, a microcontroller or another general or special purpose device operating under programmed control. As will be appreciated by persons skilled in the art, the systems of each of the clients 133, 134, 143, 144 may further include an electronic memory such as a random access memory (RAM) or an electronically programmable read only memory (EPROM), a storage device such as a hard drive, a CDROM or a rewritable CDROM or another magnetic, or optical medium, and other associated components connected over an electronic bus. The systems of each of the clients 133, 134, 143, 144 may also include a network-enabled appliance such as a WebTV™ unit, a radio-enabled Palm™ Pilot or a similar unit, a set-top box, a networkable game-playing console such as a Sony Playstation™ or a Sega Dreamcast™, a browser-equipped cellular telephone, or another TCP/IP client or other device.

The supplier site 110 may maintain a high speed, large bandwidth communications link to the Internet 101. The communications link may include or interface to any one or more of the Internet 101, an intranet, a Personal Area Network (PAN), a Local Area Network (LAN), a Wide Area Network (WAN), a Metropolitan Area Network (MAN), a storage area network (SAN), a frame relay connection, an Advanced Intelligent Network (AIN) connection, a synchronous optical network (SONET) connection, a digital T1, T3, E1 or E3 line, a Digital Data Service (DDS) connection, a Digital Subscriber Line (DSL) connection, an Ethernet connection, an Integrated Services Digital Network (ISDN) line, a dial-up port such as a V.90, a V.34 or a V.34bis analog modem connection, a cable modem, an Asynchronous Transfer Mode (ATM) connection, a Fiber Distributed Data Interface (FDDI) connection, or a Copper Distributed Data Interface (CDDI) connection. The communications link may further include or interface to any one or more of a Wireless Application Protocol (WAP) link, a General Packet Radio Service (GPRS) link, a Global System for Mobile Communication (GSM) link, a Code Division Multiple Access (CDMA) link, a Time Division Multiple Access (TDMA) link such as a cellular phone channel, a Global Positioning System (GPS) link, a cellular digital packet data (CDPD) link, a Research in Motion, Limited (RIM) duplex paging type device, a Bluetooth radio link, or an IEEE 802.11-based radio frequency link. The communications link may further include or interface to any one or more of an RS-232 serial connection, an IEEE-1394 (Firewire) connection, a Fibre Channel connection, an infrared (IrDA) port connection, a Small Computer Systems Interface (SCSI) connection, a Universal Serial Bus (USB) connection or another wired or wireless, digital or analog interface or connection.

The supplier site 110 may comprise either a single server computer or a multiple server computer configured to appear to the clients 133, 134, 143, 144 as a single resource. The supplier site 110 may receive requests for sales-related data from any one or more of the clients 133, 134, 143, 144 through the Internet 101.

The database 120 may be located within the supplier site 110 or may be coupled to the supplier site 110. The database 120 may store various software applications, interface templates for receiving customer information, broker information, and any other information or templates that may be necessary for providing sales-related data.

Figure 2:
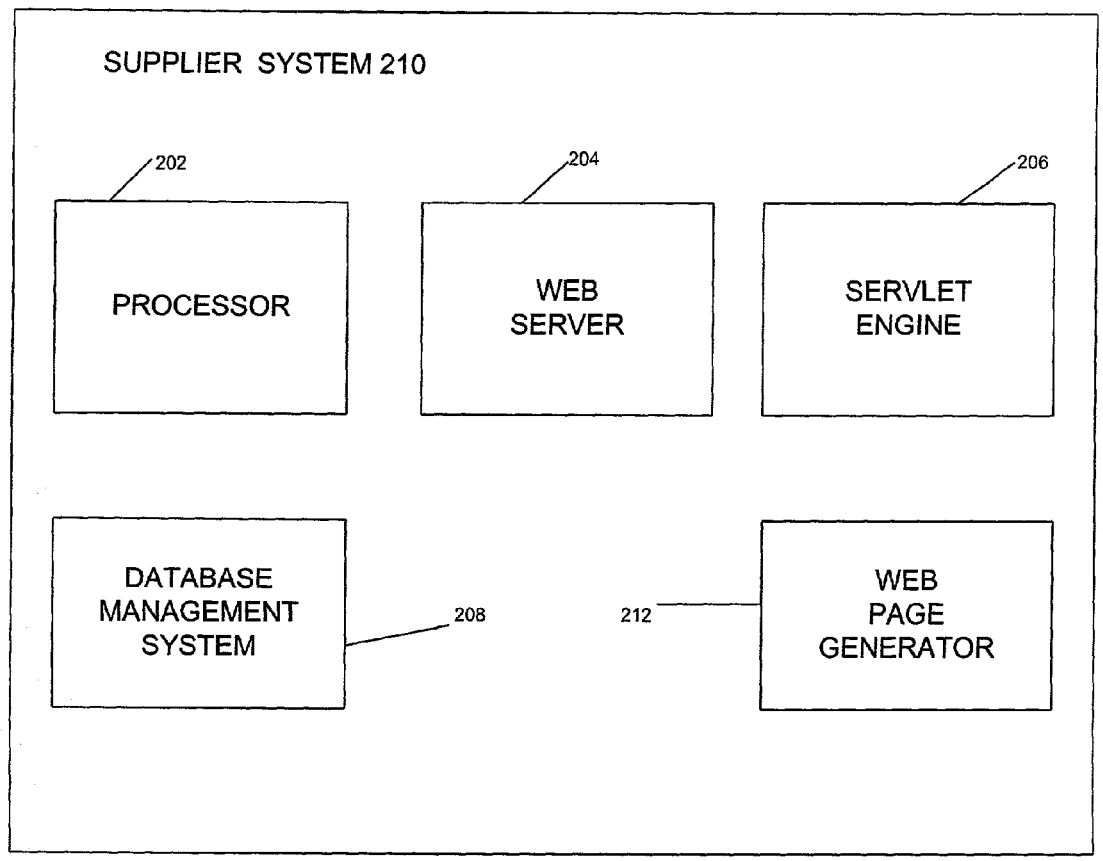
FIG. 2 is a block diagram illustrating one embodiment of a supplier system for providing customized sales-related data over a network.

FIG. 2 is a block diagram illustrating one embodiment of a system 210 for providing customized sales-related data. The supplier system 210 may include a processor 202, a web server 204, a servlet engine 206, a database management system 208 and a web page generator 212.

The web server 204 and the servlet engine 206 may be coupled to the systems of the clients 133, 134, 143, 144 (shown in FIG. 1) through a network, such as the Internet 101. The database management system 208 may include a database server. In one embodiment, the database 120 (shown in FIG. 1) may be a part of the database management system 208. Thus, in one embodiment, the database 120 may be within the supplier system 210.

The supplier system 210, the web server 204 and the servlet engine 206, may be used by a user using a browser associated with one of the systems of one of the clients 133, 134, 143,

144 to access sales-related data. A broker system may also reside on one or more of the remaining client systems 133, 134, 143, 144. The user using one of the client systems 133, 134, 143, 144 may access a plurality of web pages created by a broker system of one of the remaining client systems 133, 134, 143, 144. The broker web pages may be accessed by the user by inputting a network address, such as, for example, a URL, into the browser. The broker web pages may include a link to the supplier system 210 web site. In one embodiment, the link may be a button offering sales-related data, such as, for example, an online insurance premium quote.

The web page generator 212 may generate a plurality of web pages including the appropriate sales-related data and customized broker data retrieved using the database management system 208. The processor 202 may execute a plurality of instructions generated by the web server 204, the servlet engine 206, the database management system 208, the web page generator 212 and any other sources of instructions.

In one embodiment, the supplier system 210 may be delivered on a Netscape™ Enterprise server running on a Sun Solaris™ computer system. The database 120 may be an Oracle™ 8i database application also running on the Sun Solaris™ computer system. In one embodiment, the entire supplier system 210 web site may be written in HTML program code, with a sales-related data provider engine being built with a plurality of JAVA servlets. In one embodiment, the web pages generated by web page generator 212 may be SSL-encrypted.

Figure 3:
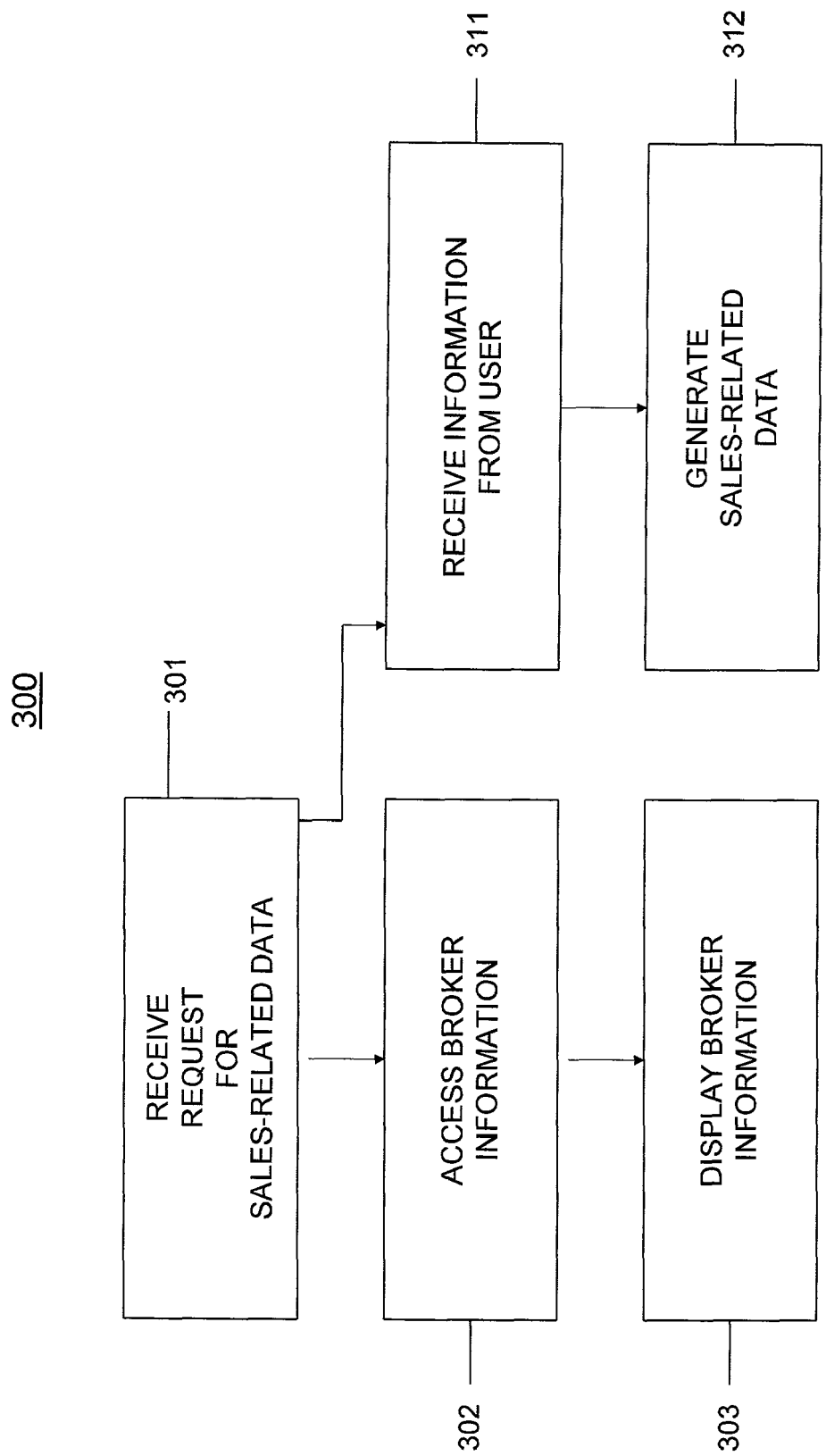
FIG. 3 is a flow diagram illustrating the steps performed in a method for providing customized sales-related data in accordance with an embodiment of the invention.

FIG. 3 is a flow diagram illustrating the steps performed during a method 300 for providing sales-related data pursuant to a user request. At step 301, the supplier system 210 of FIG. 2 receives a request for sales-related data from a user associated with one of the systems of one of the clients 133, 134, 143, 144 located at a broker network address or URL affiliated with a broker web site. The requested sales-related data may include any type of sales-related data including, for example, an insurance premium quote. At step 302, the supplier system 210 may then use the broker network address or URL to access and retrieve broker information from the database 120. At step 303, the supplier system 210 may display at least a portion of the accessed and retrieved broker information. For example, the supplier system 210 may display contact information including a name, a telephone number and/or an e-mail address of the broker web site from which the user accessed the supplier system 210.

At step 311, the supplier system 210 may receive the sales-related data request from the user. In order to submit the sales-related data request, the user may be requested to complete and submit an information form generated by the supplier system 210 using the web page generator 212. For example, if the sales-related data request is a request for an insurance premium quote, the information form generated by the supplier system 210 may be an underwriting questionnaire.

The information associated with the information form may request that the user provide a state of residence of the user, a date of birth of the user, a height, a weight, a gender of the user, and other information important in determining the sales-related data to retrieve and display to the user. For example, if the requested sales-related data is an insurance premium quote, the information required to complete the information form may include a type of insurance coverage desired (e.g., life insurance or health insurance, etc.), an amount of insurance coverage desired, and a country of citizenship of the user. The information form may also request information concerning whether the user has been a subject of a criminal conviction, whether the user has a history of drug use, a history of alcohol use, or a history of tobacco use, whether the user has flown on a non-commercial airplane, whether the user typically engages in any dangerous activities (e.g., hang-gliding, hot air ballooning, mountain or rock climbing, motor vehicle racing, skydiving, scuba-diving, etc.), a cholesterol level of the user, a blood pressure level of the user, and a family history or a personal history.

The family or personal history questions on the information form may include questions designed to ascertain whether the user has a history of cardiovascular disease or cancer, a history of psychological disorders, a history of respiratory disorders, a history of neurological disorders and/or a history of gastrointestinal disorders. The personal history questions may also include questions designed to ascertain whether the user has a history of diabetes, or has been subject to a treatment for cancer and/or AIDS/HIV. The information form may include a plurality of edit fields, a plurality of radio button options and/or a plurality of drop-down fields. The user may submit the information form to the supplier system 210 by selecting a button presented on a display, such as, for example, a submit button or a next button displayed on the information form presented by the supplier system 210.

At step 312, the supplier system 210 may generate sales-related data based on the information provided by the user on the submitted information form. The step 312 of generating sales-related data may include a sub-step of validating that proper selections have been made for each field in the submitted information form. In one embodiment, if the proper fields have not been completed by the user, the supplier system 210 may return the user back to step 311 to the information form to indicate that a selection or a value must be entered into a field which has not been completed. In another embodiment, the supplier system 210 may present the user with an error message indicating that a field has not been properly completed. The supplier system 210 may also validate that the correct form of information was entered into the fields on the information form associated with the user's date of birth or amount of insurance coverage desired. For example, the supplier system 210 may determine if the information entered is within one or more predetermined parameters or may compare the information entered in the fields to a predetermined format. The supplier system 210 may use the date of birth of the user to determine the age of the user at the user's nearest birthday (i.e., round up or down).

The supplier system 210 may also include an on-line help form. If the user chooses the on-line help form, a window may pop up containing help content for completing the information form presented by the supplier system 210 in step 311.

For some entries made by the user in the information form, the supplier system 210 may display one or more predetermined dialog boxes including additional information that the user may require. For example, if a user selects YES for a question of whether the user has flown on a non-commercial airplane, a JAVA script pop-up dialog box may be displayed with text for an "Exclusion Aviation Rider." In another embodiment, if the user indicates that the user engages in any of the dangerous activities included in that question of the information form, a JAVA script pop-up dialog box with legal notes for the insurance premium quote sales-related data requested may be displayed by the supplier system 210.

If the information form has a plurality of pages, a previous page button and a next page button may be displayed at the bottom of the information form. The next page button may operate to submit a current page of the information form for validation and may then move the user to the next page of the information form if the current page has been successfully validated. The previous page button may take the user back to a previous page of the information form.

Upon submission of each page of the information form, the information submitted by the user in response to the questions on each page may be written to a visitor_tracking_table of the database 120 associated with the supplier system 210. At the end of submission of all of the requested information for the information form, the responses of the user to each of the questions may be displayed in a summarized format and the user may then have an opportunity to change any of the user's responses by returning to the information form presented in step 311. Alternatively, the supplier system 210 may continue to display the pages of the information form without displaying the summarized format for the responses.

In one embodiment, the step 312 of generating the sales-related data may include evaluating the information form received from the user. The supplier system 210 may display one or more pages containing information indicating why sales-related data may not be displayed based on the answers given by the user in response to the questions in the information form. For example, in the case of a request for an insurance quote, if, as a result of the user's answers, the user is determined to fall within a particular risk class for which an online insurance quote cannot be provided, then the supplier system 210 may redirect the user to a "cannot quote on-line" page. In another embodiment, if the age of the user, as determined by the supplier system 210, is not within an age range for any insurance product available for quoting, the supplier system 210 may redirect the user to an "age out of range" page. In yet another embodiment, the supplier system 210 may check for an insurability of the user using a height look-up table and a weight look-up table. If the user's height/weight parameters are out of range, then the user may be redirected to the "cannot quote on-line" page. If the supplier system 210 determines that the user should be declined for insurance coverage, the supplier system 210 may redirect the user to a "decline to underwrite" page. If the user is in a state that does not allow on-line insurance quotes, or the information supplied by the user does not fall within one or more predefined parameters which indicate that certain insurance products are not available in the user's state of residence, the supplier system 210 may redirect the user to the "cannot quote on-line" page for the user's state of residence, such as, a "cannot quote on-line in New Jersey" page.

Figure 4:
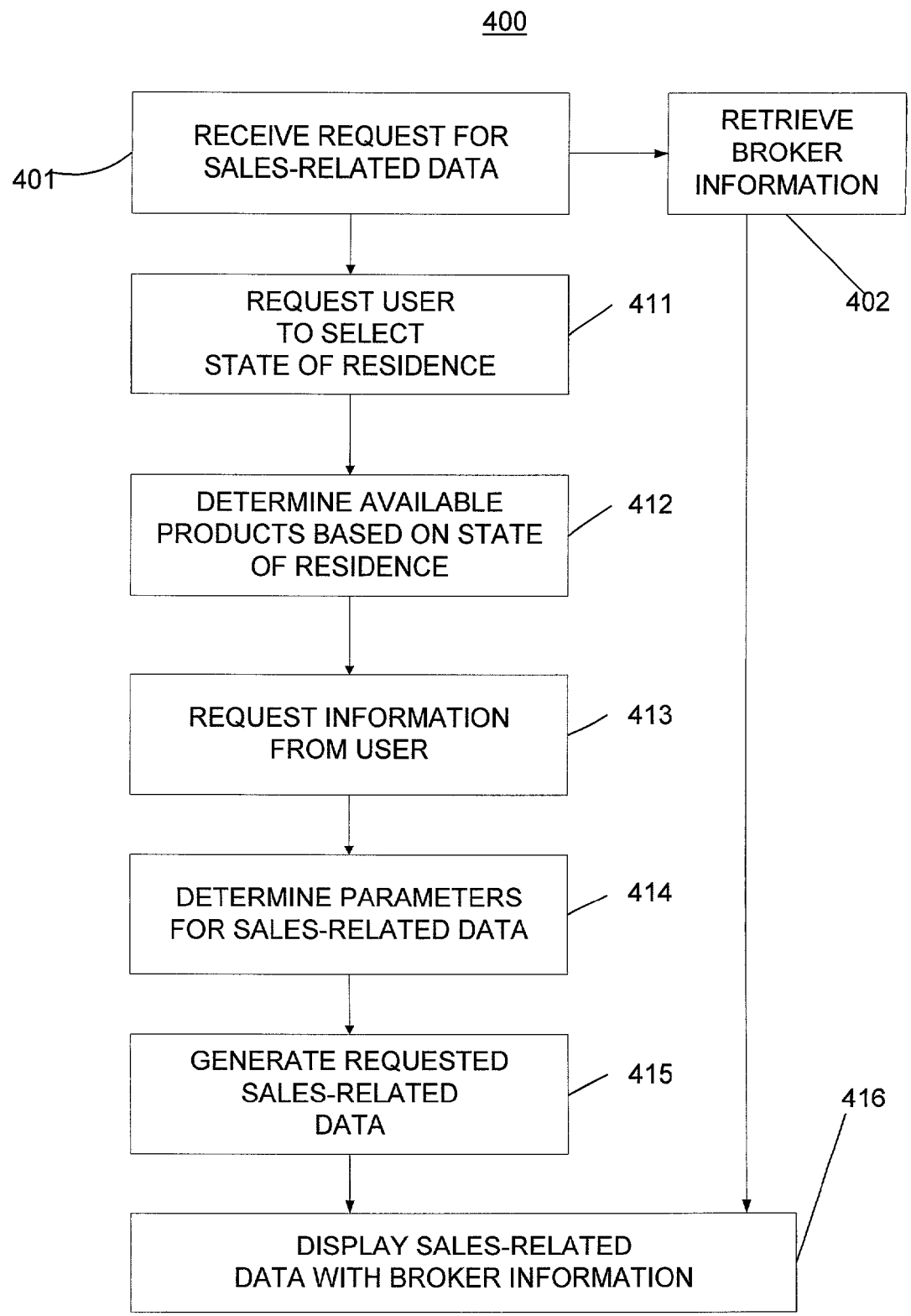
FIG. 4 is a flow diagram illustrating the steps performed in another embodiment of the method for providing customized sales-related data.

FIG. 4 is a flow diagram illustrating the steps performed in another embodiment of the method for providing sales-related data in accordance with the present invention. As shown in FIG. 4, a method 400 begins at step 401, wherein the supplier system 210 may receive a request for sales-related data for the supplier's products from a user at a broker web site. At step 402, the supplier system 210 may retrieve broker information from the database 120. At step 411, the supplier system 210 may request the user to select the user's state of residence. At step 412, the supplier system 210 may determine products available for sale to the user based on the user's state of residence. For example, if the supplier that hosts the supplier system 210 web site is a provider of insurance products, certain ones of such insurance products may only be available for sale in particular states. At step 413, the supplier system 210 may request information from the user in order to supply the user with the sales-related data requested by the user. At step 414, the supplier system 210 may determine one or more parameters for the sales-related data to be generated. At step 415, the supplier system 210 may generate the requested sales-related data. At step 416, the supplier system 210 may display the requested sales-related data together with broker information relating to the broker affiliated with the broker web site from which the user accessed the supplier system 210.

The method 400 of FIG. 4 will be described in more detail in connection with a situation wherein the supplier that hosts the supplier system 210 web site is an insurance provider and the supplier system 210 is comprised of an insurance quote engine. At step 401, the insurance quote engine of the supplier system 210 may receive a request for an insurance quote from a user accessing the supplier system 210 via a broker web site as described above with reference to FIG. 3. At step 402, the insurance quote engine of the supplier system 210 may retrieve broker information to be included with subsequent pages displayed by the insurance quote engine of the supplier system 210 to the user. At step 411, the user may be prompted by the supplier system 210 to select and input his or her state of residence. At step 412, the supplier system 210 may determine the insurance products of the supplier that are available for sale or quotation for sale to the user based on the user's state of residence. Thus, for example, the supplier system 210 may direct the user to a correct content area of the supplier system 210 web site for the user's state of residence.

Within the content area for the user's state of residence, the user may have an option to get a free on-line quote for an insurance product. The supplier system 210 may validate that a selection for the user's state of residence has been made, as described above with reference to step 312 of FIG. 3. If a valid selection has not been made, the supplier system 210 may display an error message and/or return the user to the state selection web page and indicate that a correct selection needs to be made. Once a valid selection has been made by the user, the selected state of residence and a current date and a time may be written to the visitor_tracking_table of the database 120.

The supplier system 210 may request additional information from the user at step 413. The supplier system 210 may request the information by presenting the user with the information form, such as the underwriting questionnaire discussed above. The requested information may include one or more of a date of birth of the user, a height, a weight, and a gender of the user, an amount of insurance coverage desired by the user, a country of citizenship and/or a country of residence of the user. The user may submit the completed information form to the supplier system 210 by selecting either a NEXT button or a SUBMIT button. The supplier system 210 may then validate that a correct selection was made for every field on the information form presented and that correct information was entered for a certain field, such as, the date of birth field or the amount of insurance coverage desired field.

The supplier system 210 may return the user to the information form if the user does not correctly complete the information form and may indicate any fields in the information form for which values should be entered. The supplier system 210 may use the input date of birth data to calculate the age of the user. Results of the questions submitted by the user may be written to the visitor_tracking_table of the database 120.

The supplier system 210 may then determine one or more parameters for the requested sales-related data at step 414. For example, the supplier system 210 may use the height and the weight and the age of the user to generate sales-related data at step 415. For example, if the height and the weight of the user places the user outside of certain allowable ranges for a particular insurance product, or if the age of the user is outside of the limits for insurance products available to the user in the user's state of residence, the supplier system 210 may redirect the user to the "decline to underwrite" page or the "age out of range" page, respectively. At step 416, the supplier system 210 may display these pages to the user together with the broker information retrieved at step 402.

In one embodiment, step 413 may also include a sub-step wherein the supplier system 210 presents the user with one or more lifestyle questions to be completed in the information form such as, a question relating to whether the user has a criminal record, a question relating to whether the user has a history of drug abuse, a question relating to whether the user has a history of alcohol abuse, a question relating to whether the user has a history of tobacco use, a question relating to whether the user travels by non-commercial airplane, a question relating to whether the user engages in any dangerous activities, and a question relating to the user's cholesterol level and/or blood pressure level. The supplier system 210 may validate that a selection was made for every field on the information form. The supplier system 210 may then perform the error process described above with reference to FIG. 3 to determine whether there are any errors on the information form. If there are no errors, then the information form and the user are validated and the supplier system 210 may then write the information included in the user's information form to the visitor_tracking_table of the database 120. The visitor_tracking_table may be used to generate reports to transmit to brokers or for use internally by the supplier system 210.

In one embodiment, the supplier system 210 may also present the user with one or more family history questions with respect to the information form. The family history questions may include a series of questions relating to whether there is a history of cardiovascular disease, cancer, psychological disorders, respiratory disorders, neurological disorders, and/or gastrointestinal disorders in the user's family. The supplier system 210 then may perform the validation/error process as described above.

The supplier system 210 may also present the user with a series of personal history questions at step 413. These personal history questions may include a question relating to whether the user has been treated for any type of cancer, a question relating to whether the user is a diabetic, or a question relating to whether the user has AIDS/HIV. The supplier system 210 may then perform the validation process again and, if the user is validated, write the submitted information to the visitor_tracking_table.

In one embodiment, the supplier system 210 may display the user's responses to the underwriting questions in the information form in a summarized format and allow the user to change any of the user's responses by returning to the information form. In another embodiment, the supplier system 210 may continue to generate the insurance quote at step 415 and may display a quoted premium page at step 416.

In one embodiment, the step 414 for determining one or more parameters for the sales-related data may also include a sub-step of determining the user's risk class based on the user's responses to the underwriting questions in the information form. Once the user's risk class that has been determined, the supplier system 210 may then pass the user to a next step which includes a lookup/calculate rates process. The user's risk class may be stored in the visitor_tracking_table in a risk_code_ID field. A plurality of potential risk classes may include, for example, a preferred best risk class, a preferred non-smoker risk class, a standard-risk class, a non-smoker risk class, a preferred smoker risk class, a standard plus smoker risk class, a preferred best non-smoker risk class or a select non-smoker risk class. The risk classes may depend upon the state of residence of the user.

The lookup/calculate rates process may be a part of the operations performed in step 415. In one embodiment, step 415 may also include a sub-step of using one or more business rules from an underwriting classification document to determine whether to redirect the user to the "decline to underwrite" page.

Step 415 may further include a sub-step of looking up one or more rates for an insurance premium for an insurance product for the user based on the user's age, state of residence, gender and risk class for each insurance product available in the user's state of residence. The rate for the premium for the insurance product for the user may be calculated based on a formula such as, for example, Annual Premium=Rate (risk class, gender, state, age)*face value/1,000+policy fee. The policy fee may be any predetermined amount such as, for example, $50/year.

The supplier system 210 may look up rates for insurance premiums in a term_rate_table in the database 120. At step 415, the supplier system 210 may retrieve the rate for each insurance product available to the user based upon the user's state of residence. The supplier system 210 may then calculate the annual premium associated with each insurance product.

At step 416, the supplier system 210 may display a first year's premium for each available insurance product for the user to compare the different rates associated with the insurance products. The supplier system 210 may also allow the user to select a particular insurance product in order to obtain additional information concerning such insurance product. In one embodiment, the supplier system 210 may allow the user to enter a new insurance coverage amount in order to generate different quotes for premiums.

If the user selects a particular insurance product for which the user desires to apply for coverage, the supplier system 210 may record the insurance product selected in the visitor_tracking_table and redirect the user to a "apply for quote" process. The "apply for quote" process may include allowing the user to provide contact information in order that a representative for the insurance provider suppler may contact the user in connection with an application for the selected insurance product. The supplier system 210 may provide the user with a form including one or more fields that the user may edit or make selections within. The supplier system 210 may validate this form using the validation/error processes described above.

The supplier system 210 may generate an e-mail message to be sent to the broker from whose web site the user accessed the supplier system 210. In one embodiment, the supplier system 210 may transmit the e-mail message to a first e-mail address of the broker if the user's state of residence corresponds to a state in which the broker is licensed to do business. If the user's state of residence does not correspond to a state in which the broker is licensed to do business, the supplier system 210 may generate an e-mail message and transmit the e-mail message to a second e-mail address of the broker. The e-mail message(s) generated by the supplier system 210 may include the contact information entered by the user. Finally, a last optional step in the method 400 involves the supplier system 210 displaying a page to confirm receipt of the user's information, sending a thank-you, or displaying any other related information to the user.

As is apparent from the above detailed description, the system and method of the present invention overcomes the deficiencies associated with various prior systems and methods for distributing sales-related data to brokers, agents and/or customers of a supplier and the deficiencies associated with the timeliness of such sales-related data in prior systems and methods. The customer can access the supplier's system remotely from a broker web site and obtain the most current sales-related data directly from the supplier's system.

It will be apparent to those skilled in the art that various modifications and variations can be made in the methods and apparatus of the present invention without departing from the scope or spirit of the invention. Thus, it is intended that the present invention cover the modifications and variations provided they come within the scope of the appended claims and their equivalents.

What is claimed is:

1. A method for providing state specific sales-related data relating to insurance, over a network, the sales related data being forwarded from a supplier to a broker and being customized for the broker, the method comprising the steps of:
   accessing at least one web page of a broker by inputting a broker network address;
   receiving, at a supplier by a computer device, a request for sales-related data from a user associated with a broker, the request for sales related data being transmitted from the broker network address of the broker, the broker network address being utilized for the transmission of the request for sales-related data;
   accessing broker information, at the supplier by the computer device, using the broker network address to retrieve broker information from a broker information database of the supplier;
   displaying, to the user, at least a portion of the broker information with at least a portion of insurance related information;
   receiving, at the supplier by the computer device, request-related information from the user;
   accessing state related information, at the supplier by the computer device, that includes at least one of the user's state of residence and the state in which the broker is licensed; and
   generating the sales-related data, at the supplier by the computer device, based on the received request-related information and based on the state related information.

2. The method of claim 1 further comprising the steps of:
   asking the user to select the user's state of residence; and receiving the user's state of residence selection,
   wherein the step of generating the sales-related data includes the sub-step of determining the sales-related data to generate based on the user's state of residence selection.

3. The method of claim 2 further comprising the steps of:
   receiving a request from the user to send an email to a broker;
   transmitting an email to a first email address of the broker if the user's state of residence selection corresponds to a state in which the broker is licensed to do business; and
   transmitting an email to a second email address of the broker if the user's state of residence selection does not correspond to a state in which the broker is licensed to do business.

4. The method of claim 1 wherein the step of receiving the request-related information from the user includes receiving at least one of a data of birth, a state of residence, a height, a weight, a gender, a type of product desired, and a county of citizenship.

5. The method of claim 1 further comprising the step of determining the sales-related data based on the received request-related information.

6. The method of claim 1 further comprising the step of requesting the request-related information from the user and returning an error message if the user fails to appropriately provide any portion of the request-related information.

7. The method of claim 1 further comprising the step of requesting the request-related information from the user and returning the user to a request-related information form if the user fails to appropriately provide any portion of the request-related information.

8. The method of claim 1 further comprising the step of determining an eligibility of the user from the request-related information and displaying a decline message if the request-related information indicates that the user is not eligible to purchase any one of a plurality of available products.

9. The method of claim 1 wherein the broker information comprises broker contact information.

10. The method of claim 1, the broker network address is a URL.

11. A method for providing state specific sales-related data relating to insurance, over a network, the sales related data being forwarded from a supplier to a broker and being customized for the broker, the method comprising the steps of:
    receiving, at a supplier by a computer device, a request for sales-related data from a user associated with a broker, the request for sales related data input from a broker network address of the broker, the broker network address being utilized to submit the request for sales-related data;
    accessing, by the computer device, broker information from a broker information database based on the broker network address;
    displaying, to the user, at least a portion of the broker information with at least a portion of insurance related information;
    receiving, by the computer device, request-related information from the user;
    accessing, by the computer device, state related information that includes at least one of the user's state of residence and the state in which the broker is licensed; and
    generating the sales-related data, by the computer device, based on the received request-related information and based on the state related information; and
    the method further comprising the steps of:
      asking the user to select the user's state of residence; and receiving the user's state of residence selection,
      wherein the step of generating the sales-related data includes the sub-step of
    determining the sales-related data to generate based on the user's state of residence selection; and
    the method further comprising the steps of:
      receiving a request from the user to send an email to a broker;
      transmitting an email to a first email address of the broker if the user's state of residence selection corresponds to a state in which the broker is licensed to do business; and
      transmitting an email to a second email address of the broker if the user's state of residence selection does not correspond to a state in which the broker is licensed to do business.

12. A method for providing state specific sales-related data relating to insurance, over a network, the sales related data being forwarded from a supplier to a broker and being customized for the broker, the method comprising the steps of:
    accessing at least one web page of a broker by inputting a broker network address;
    receiving, at a supplier, by a computer device, a request for sales-related data from a user associated with a broker, wherein the request for sales related data is transmitted from the at least one web page of the broker having the broker network address;

retrieving broker information from a broker information database located at the supplier based on the broker network address;

displaying, to the user, at least a portion of the broker information with at least a portion of insurance related information;

receiving, at the supplier by the computer device, user information associated with the sales-related data:

determining, at the supplier by the computer device, one or more parameters for the sales-related data based on the user information;

accessing state related information, at the supplier by the computer device, wherein the state related information comprise at least one of the user's state of residence and a state in which the broker is licensed; and generating the sales-related data, at the supplier by the computer device, based on the received user information, the one or more parameters, and on the state related information, the generating the sales-related data constituted by generation of a further web page containing the sales-related data.

13. The method of claim 12, wherein determining, at the supplier, one or more parameters for the sales-related data based on the user information comprises determining a risk class associated with the user based on the user information.

14. The method of claim 12, the broker network address is a URL.

* * * * *